(12) United States Patent
Ide et al.

(10) Patent No.: US 9,931,916 B2
(45) Date of Patent: Apr. 3, 2018

(54) MOVING DEVICE

(71) Applicant: AISIN SEIKI KABUSHISIKI KAISHA, Kariya-shi, Aichi-ken (JP)

(72) Inventors: Yoshitaka Ide, Anjo (JP); Kazuhiko Yoshizawa, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/337,258

(22) Filed: Oct. 28, 2016

(65) Prior Publication Data
US 2017/0120735 A1    May 4, 2017

(30) Foreign Application Priority Data
Oct. 29, 2015    (JP) .................................. 2015-213460

(51) Int. Cl.
| | |
|---|---|
| *B60J 7/057* | (2006.01) |
| *B60J 7/02* | (2006.01) |
| *B60J 7/00* | (2006.01) |
| *B60J 7/06* | (2006.01) |

(52) U.S. Cl.
CPC ............... *B60J 7/02* (2013.01); *B60J 7/0015* (2013.01); *B60J 7/067* (2013.01)

(58) Field of Classification Search
CPC ... B60J 7/02; B60J 7/022; B60J 7/0015; B60J 7/043; B60J 7/0573
See application file for complete search history.

(56) References Cited

U.S. PATENT DOCUMENTS

| | | | | |
|---|---|---|---|---|
| 4,811,985 A | * | 3/1989 | Kruger ..................... | B60J 7/003 296/214 |
| 5,048,890 A | * | 9/1991 | Masuda ..................... | B60J 7/05 296/216.08 |
| 6,024,404 A | * | 2/2000 | Stallfort ................... | B60J 7/057 296/216.04 |

(Continued)

FOREIGN PATENT DOCUMENTS

| | | |
|---|---|---|
| DE | 3425273 A1 | 7/1984 |
| JP | 4411985 | 2/2010 |

OTHER PUBLICATIONS

European Search Report issued in European application No. 16195827.7-1757 dated Apr. 20, 2017.

*Primary Examiner* — Katherine W Mitchell
*Assistant Examiner* — Abe Massad
(74) *Attorney, Agent, or Firm* — Finnegan, Henderson, Farabow, Garrett & Dunner, LLP (57) ABSTRACT

A moving device includes: a moving body; guide rails extending in a moving direction of the moving body on both sides in one direction orthogonal to the moving direction and each of which has first and second guides mutually symmetrical in the one direction, and a third guide interposed between the first and second guides; connecting portions provided at both-side end portions of the moving body in the one direction and mutually symmetrical in the one direction; first and second shoes respectively mounted on the connecting portions, sliding the first and third guides and the second and third guides, and having the same shape; first and second drive belts respectively connected to the first and second shoes in the first and second guides to be integrally moved and moving and driving the first and second shoes.

4 Claims, 4 Drawing Sheets

(56) References Cited

U.S. PATENT DOCUMENTS

| | | | |
|---|---|---|---|
| 6,786,540 B2 * | 9/2004 | Friedrich | B60J 7/0573 296/223 |
| 6,874,846 B2 * | 4/2005 | Friedrich | B60J 7/057 296/216.08 |
| 8,292,359 B2 * | 10/2012 | Maruyama | B60J 7/022 296/216.08 |
| 9,296,283 B2 * | 3/2016 | Nagashima | B60J 7/043 |

* cited by examiner

MOVING DEVICE

CROSS REFERENCE TO RELATED APPLICATIONS

This application is based on and claims priority under 35 U.S.C. § 119 to Japanese Patent Application 2015-213460, filed on Oct. 29, 2015, the entire contents of which are incorporated herein by reference.

TECHNICAL FIELD

This disclosure relates to a moving device.

BACKGROUND DISCUSSION

In the related art, as a moving device, for example, a sunroof device described in Japanese Patent No. 4411985 (Reference 1) is known. The sunroof device includes a movable panel (moving body), a pair of guide rails extending in a forward and rearward direction having an interval therebetween in a width direction of a vehicle, a pair of connecting guides that are movably mounted along both guide rails and correspond to both-side edge portions of the movable panel in the width direction of the vehicle, and a pair of cables (drive belts) that drive the two connecting guides such that they move. Thus, both the connecting guides are driven by both cables such that they move and thereby a state (position and the like) of the movable panel is changed.

Moreover, the connecting guides are manufactured by outsert molding resin (shoes) on an iron plate (connecting portion) forming a backbone.

However, in Reference 1, for the connecting guides, two types of bilateral symmetry are required and two types of the iron plate, resin from which the connecting guides are made, and molds for molding them are naturally required. Therefore, it is inevitable that the number of manufacturing man-hours of the connecting guides will increase.

SUMMARY

Thus, a need exists for a moving device which is not suspectable to the drawback mentioned above.

A moving device according to an aspect of this disclosure includes a moving body; guide rails which are a pair of guide rails extending in a moving direction of the moving body on both sides in one direction orthogonal to the moving direction and in which each of the guide rails has a first guide and a second guide which are mutually symmetrical in the one direction, and a third guide interposed between the first guide and the second guide in the one direction; a pair of connecting portions that are provided at both-side end portions of the moving body in the one direction and are mutually symmetrical in the one direction; a first shoe that is mounted on one of the two connecting portions in an engagement state and slides the first guide and the third guide of the guide rail on the corresponding side; a second shoe that is mounted on the other of the two connecting portions in an engagement state, slides the second guide and the third guide of the guide rail on the corresponding side, and has the same shape as that of the first shoe; a first drive belt that is connected to the first shoe in the first guide to be integrally moved and moves and drives the first shoe; and a second drive belt that is connected to the second shoe in the second guide to be integrally moved and moves and drives the second shoe.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a moving device will be described. Moreover, in the following description, a forward and rearward direction of a vehicle is referred to as a "forward and rearward direction" and upward and downward of a height direction of the vehicle are respectively referred to as "upward" and "downward". In addition, an inside of the vehicle in a width direction toward a passenger compartment side is referred to as a "vehicle inside" and an outside of the vehicle in the width direction outward the passenger compartment side is referred to as a "vehicle outside".

Figure 1:
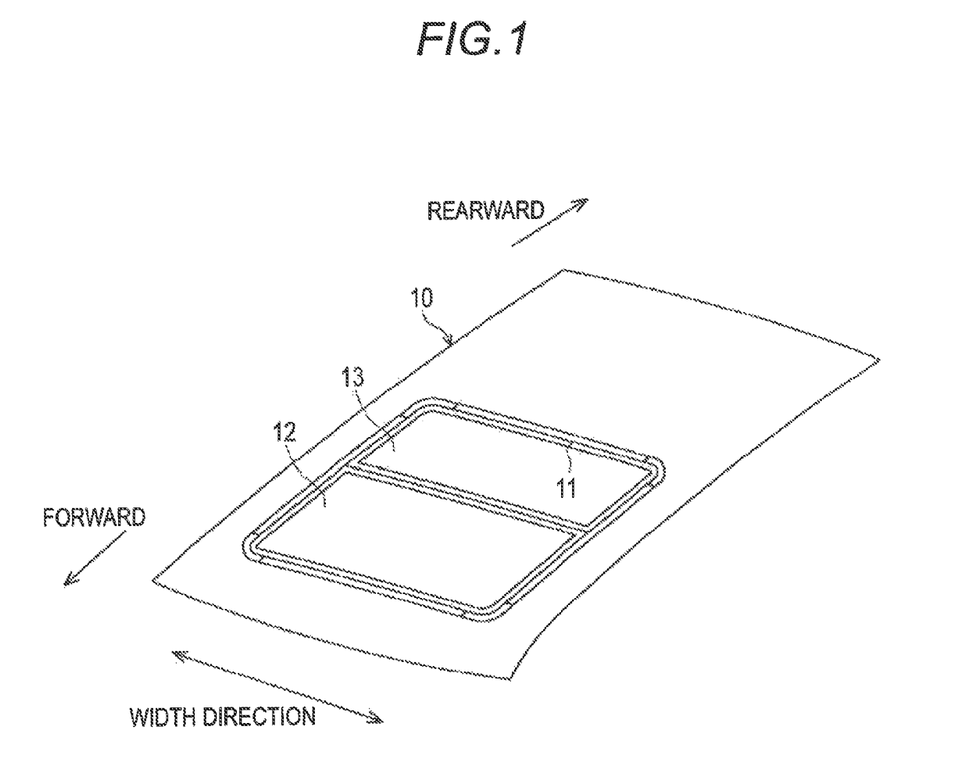
FIG. 1 is a perspective view of a roof to which an embodiment of a shade device is applied.

As illustrated in FIG. 1, in a roof 10 of the vehicle such as an automobile, a substantially rectangular opening 11 is formed and substantially rectangular movable panel 12 and a fixed panel 13 made by, for example, glass or resin are provided. The movable panel 12 is mounted on a front side of the opening 11 to be capable of opening and closing by electric power. Meanwhile, the fixed panel 13 is mounted so as to always close a rear side of the opening 11.

Figure 2:
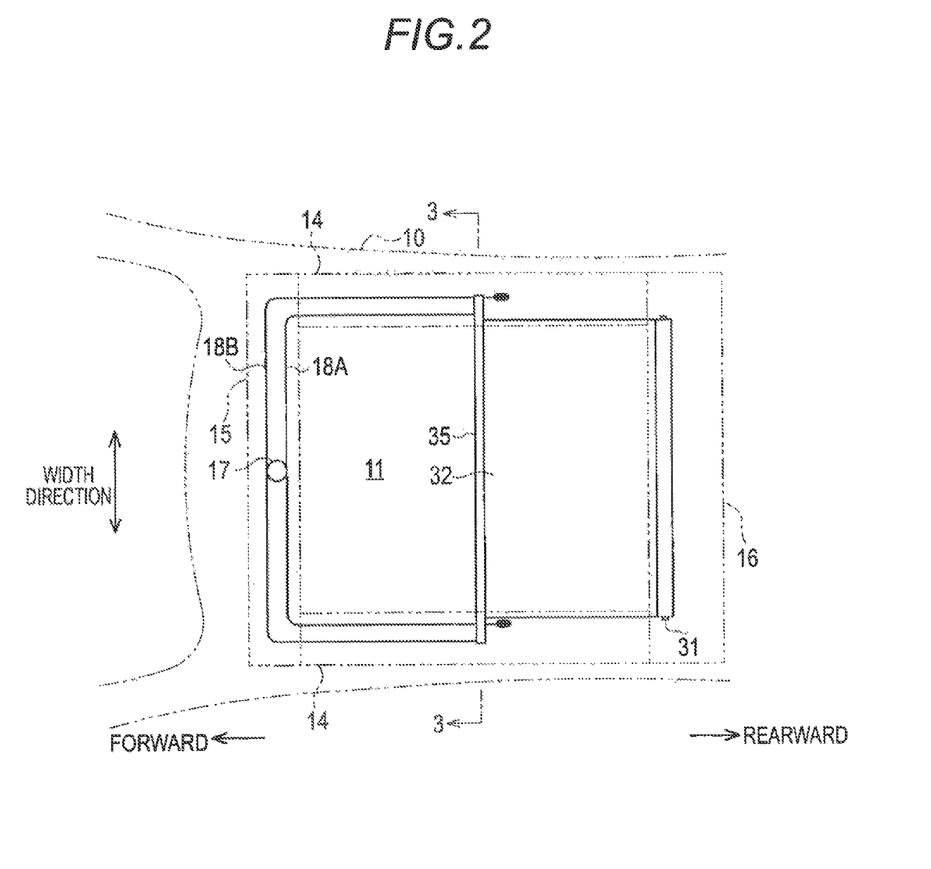
FIG. 2 is a plan view illustrating a structure of the shade device of the embodiment.

As illustrated in FIG. 2, a pair of guide rails 14 made of, for example, an extruded material of aluminum alloy are provided in the roof 10 so as to extend in the forward and rearward direction in both-side edge portions of the opening 11 in a width direction of the vehicle. That is, the two guide rails 14 extend in the forward and rearward direction parallel to each other having an interval therebetween in the width direction of the vehicle. In addition, a front housing 15 and a rear housing 16 made of, for example, a resin material are provided in a front edge portion and a rear edge portion of the opening 11 in the roof 10 so as to respectively extend in the width direction of the vehicle. Front ends and rear ends of the two guide rails 14 are respectively connected to each other by the front housing 15 and the rear housing 16. Thus, a substantially cylindrical winding shaft 31 extending the width direction of the vehicle is rotatably supported on the rear housing 16 around an axis extending in a corresponding direction.

One-side end portion of a shielding sheet 32 is connected and fixed to an outer peripheral portion of the winding shaft 31 over an entire length in the width direction of the vehicle. Thus, the winding shaft 31 causes the shielding sheet 32 to be capable of winding and unwinding in accordance with the rotation thereof. Moreover, a biasing member (for example, a torsion spring (not illustrated) and the like) for always biasing the shielding sheet 32 on a winding side is built in the winding shaft 31.

A rod-like garnish 35 extending in the width direction of the vehicle is fixed to the other side end portion of the shielding sheet 32. The garnish 35 is slidably supported on the two guide rails 14 respectively in the both-side end portions in the width direction of the vehicle.

Thus, if the shielding sheet 32 moves forward the vehicle along the two guide rails 14 together with the garnish 35, the shielding sheet 32 is unwound in a sheet form from the winding shaft 31 while the winding shaft 31 is rotated in one direction and then is in an expansion state. Therefore, light passing through the movable panel 12 and the like is cut off (closing operation). Otherwise, if the shielding sheet 32 moves rearward the vehicle along the two guide rails 14 together with the garnish 35, the shielding sheet 32 is wound in a roll form on the winding shaft 31 while the winding shaft 31 is rotated in a reverse direction and then is in a storage state. Therefore, light passing through the movable pane! 12 and the like is transmitted (opening operation). Moreover, when the garnish 35 moves in the forward and rearward direction, the both-side edge portions of the shielding sheet 32 in the width direction of the vehicle are slidably supported on the two guide rails 14 inside the two guide rails 14.

An electric drive source 17 such as an electric motor or the like having, for example, an output gear is disposed in an intermediate portion of the front housing 15 in a longitudinal direction. The electric drive source 17 is connected to the both-side end portions of the garnish 35 via a substantially strip-like first drive belt 18A and a substantially strip-like second drive belt 18B made of, for example, resin material, and drives the garnish 35 such that they move in the forward and rearward direction.

Next, a guide structure of each end portion of the guide rail 14 and the garnish 35 in the width direction of the vehicle by the guide rail 14 will be described.

Figure 3:
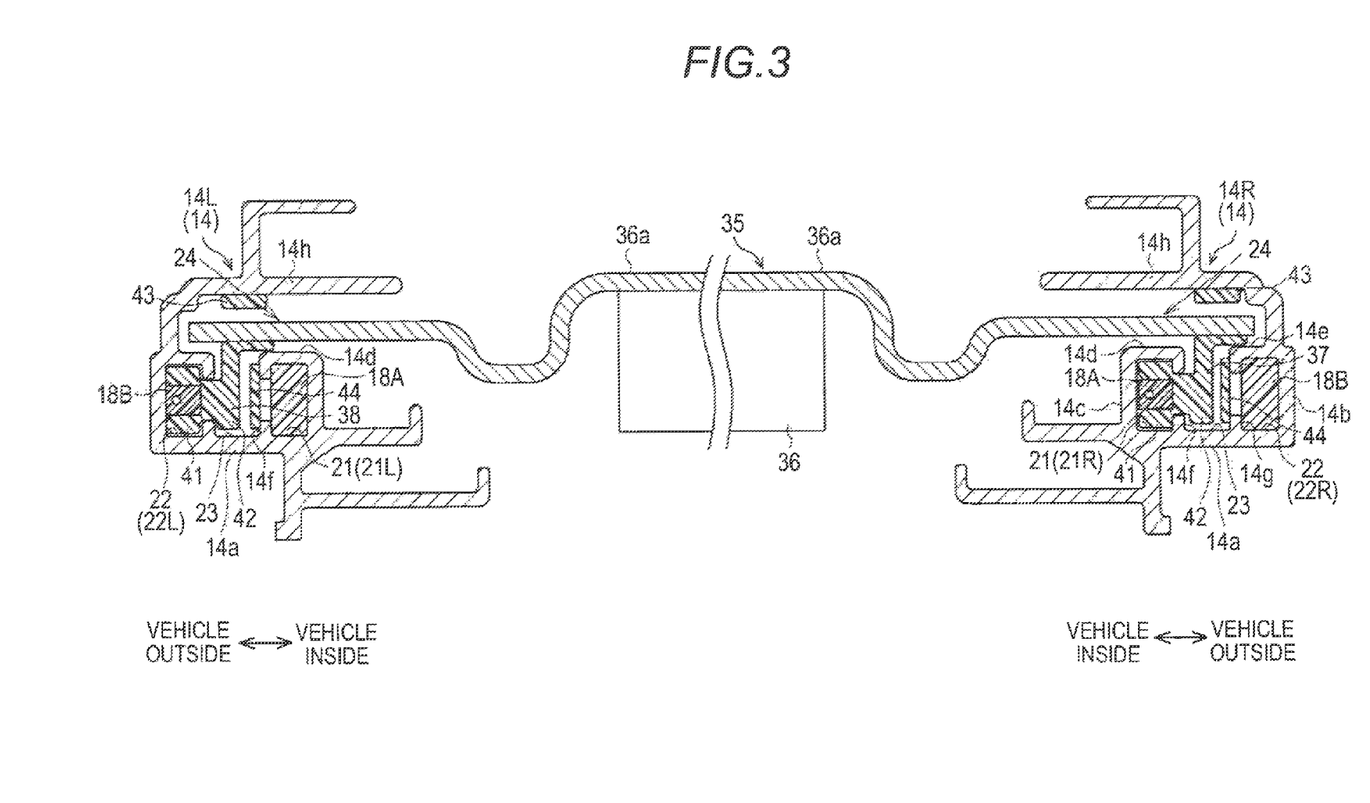
FIG. 3 is a sectional view that is taken along line 3-3 of FIG. 2.

As illustrated in FIG. 3, the two guide rails 14 (hereinafter, also referred to as "guide rails 14R and 14L" for distinguishing the guide rails 14) are mutually symmetrical (bilateral symmetry) in the width direction of the vehicle. The two guide rails 14R and 14L are mutually symmetrical in the width direction of the vehicle by reversing an orientation of one of the two guide rails 14R and 14L in the forward and rearward direction after cutting the two guide rails 14R and 14L in accordance with dimensions thereof in the forward and rearward direction from the same extruded material.

Each guide rail 14 has a substantially elongated bottom wall 14a extending in the forward and rearward direction (direction orthogonal to a paper surface) and has a side wall 14b and a vertical wall 14c which are respectively erected upward at an end of the bottom wall 14a on the vehicle outside and at an intermediate portion in the width direction of the vehicle. The side wall 14b protrudes upward more than the vertical wall 14c. In addition, each guide rail 14 has an upper wall 14d having a cross-section of a substantially L-shape protruding from an upper end of the vertical wall 14c to the vehicle outside and has an upper wall 14e having a cross-section of a substantially L-shape protruding from the side wail 14b to the vehicle inside to face the upper wall 14d in the width direction of the vehicle. Furthermore, each guide rail 14 has a substantially rib-shaped pair of slip-off preventing pieces 14f and 14g which are respectively erected upward at a position of a tip (end of the vehicle outside) of the upper wall 14d and a position of a tip (end of the vehicle inside) of the upper wall 14e in the width direction of the vehicle in the bottom wall 14a. In addition, each guide rail 14 has a ceiling wall 14h protruding from the upper end of the side wall 14b to the vehicle inside. Moreover, the ceiling wall 14h has a substantially elongated shape extending in the forward and rearward direction substantially parallel to the bottom wall 14a and the tip of the vehicle inside thereof is positioned on the vehicle inside more than the vertical wall 14c. Of course, the ceiling wall 14h is positioned above the upper walls 14d and 14e. A gap between the upper walls 14d and 14e, and the ceiling wall 14h in a height direction of the vehicle forms an inserting hole 24.

Thus, each guide rail 14 forms a first guide 21 that is made in cooperation with the bottom wall 14a, the upper wall 14d, and the slip-off preventing piece 14f, and on the vehicle inside including the vertical wall 14c, and forms a second guide 22 that is made in cooperation with the bottom wall 14a, the upper wall 14e, and the slip-off preventing piece 14g, and on the vehicle outside including the side wall 14b, The first guide 21 and the second guide 22 are mutually symmetrical (bilateral symmetry) in the width direction of the vehicle, In addition, each guide rail 14 forms a third guide 23 between the first and second guides 21 and 22 in the width direction of the vehicle.

Moreover, the first guide 21 and the second guide 22 of the guide rail 14R on one side respectively configure a first belt guide 21R and a second remaining belt guide 22R. The second guide 22 and the first guide 21 of the guide rail 14L on the other side respectively configure a second belt guide 22L and a first remaining belt guide 21L.

On the other hand, the garnish 35 has a garnish body 36 as a moving body that is formed in a rod-shape made of, for example, a resin material and extends in the width direction of the vehicle. A substantially wing shaped pair of connecting portions 36a made of, for example, an iron plate protrude to the vehicle outside in the both-side end portions of the garnish body 36 in the width direction of the vehicle (one direction orthogonal to the moving direction of the moving body). The two connecting portions 36a are mutually symmetrical (bilateral symmetry) in the width direction of the vehicle by reversing the orientation of one of the two connecting portions 36a having the same shape as each other in the forward and rearward direction.

A first shoe 37 made of, for example, a resin material is mounted on the connecting portion 36a on the guide rail 14R side in a state (engagement state) where a tip thereof passing through the inserting hole 24 is inserted. An outline of the first shoe 37 is molded in accordance with the first belt guide 21R and the third guide 23.

That is, the first shoe 37 has a belt connecting portion 41 having a cross-section of a substantially U-shape, which is movably inserted into the first belt guide 21R in a fitted state in the forward and rearward direction and has a substantially block-shaped support portion 42 that extends from the belt connecting portion 41 to the vehicle outside and is movably supported on the bottom wall 14a in the forward and rearward direction. Thus, the first shoe 37 supports each connecting portion 36a in a state where a tip of each connecting portion 36a is inserted into an upper end portion of the support portion 42. The first shoe 37 moves in the forward and rearward direction together with the connecting portion 36a (garnish body 36) in a state where the belt connecting portion 41 is fitted into the first belt guide 21R and the support portion 42 is supported on the bottom wall 14a.

A second shoe 38 made of, for example, a resin material is mounted on the connecting portion 36a on the guide rail 14L side in a state (engagement state) where a tip thereof passing through the inserting hole 24 is inserted. An outline of the second shoe 38 is molded in accordance with the second belt guide 22L and the third guide 23.

That is, the second shoe 38 has a belt connecting portion 41 having a cross-section of a substantially U-shape, which is movably inserted into the second belt guide 22L in a fitted state in the forward and rearward direction and has a substantially block-shaped support portion 42 that extends from the belt connecting portion 41 to the vehicle inside and is movably supported on the bottom wall 14a in the forward and rearward direction. Thus, the second shoe 38 supports each connecting portion 36a in a state where the tip of each connecting portion 36a is inserted into the upper end portion of the support portion 42. The second shoe 38 moves in the forward and rearward direction together with the connecting portion 36a (garnish body 36) in a state where the belt connecting portion 41 is fitted into the second belt guide 22L, and the support portion 42 is supported on the bottom wall 14a.

Figure 4:
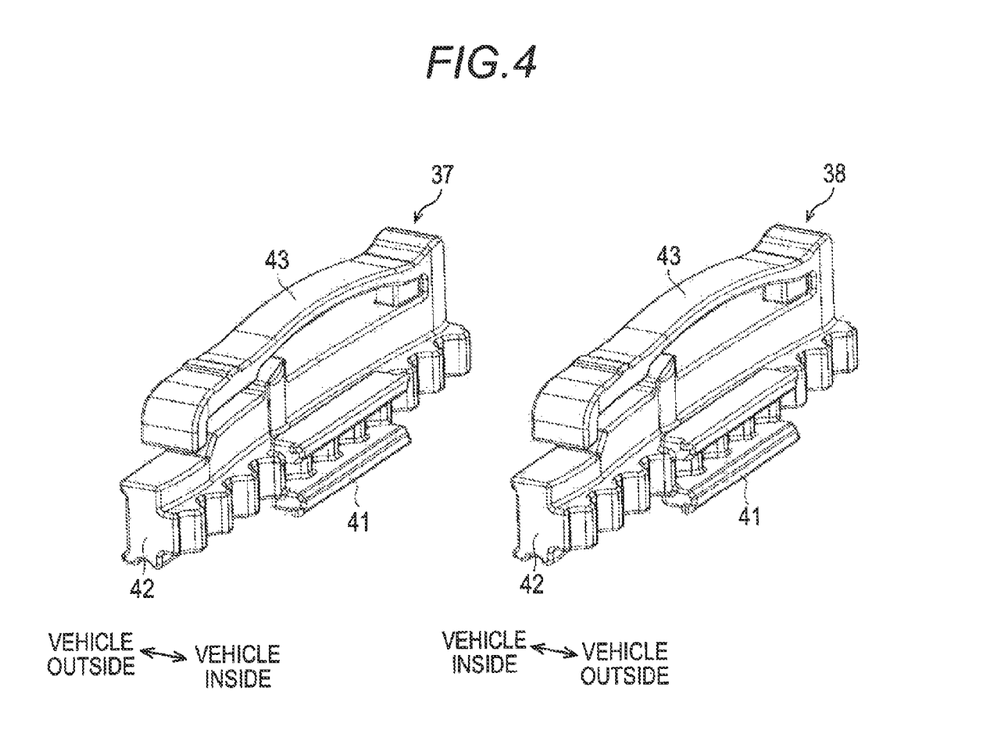
FIG. 4 is a perspective view illustrating a first shoe and a second shoe.

That is, as also illustrated in FIG. 4, the second shoe 38 has the same shape as that of the first shoe 37 and overlaps a shape in which the first shoe 37 is moved parallel to the width direction of the vehicle. Of course, the first shoe 37 on the guide rail 14R side and the second shoe 38 on the guide rail 14L side are mutually asymmetrical (bilateral asymmetry) in the width direction of the vehicle.

Here, the first belt guide 21R of the guide rail 14R guides a movement of a portion extending to the first shoe 37 side in the forward and rearward direction with respect to a connecting part of the first drive belt 18A driving the first shoe 37 to be moved to the electric drive source 17 in the fitted state. Basically, the first drive belt 18A which moves the first belt guide 21R in the fitted state is connected to the first shoe 37 in a form of fitting into a notch that is formed in accordance with the position of the belt connecting portion 41 of the first shoe 37. On the other hand, the second remaining belt guide 22R of the guide rail 14R guides the movement of a portion extending to a side opposite to the second shoe 38 in the forward and rearward direction with respect to a connecting part of the second drive belt 18B driving the second shoe 38 to be moved to the electric drive source 17 in the fitted state.

Similarly, the second belt guide 22L of the guide rail 14L guides the movement of a portion extending to the second shoe 38 side in the forward and rearward direction with respect to the connecting part of the second drive belt 18B to the electric drive source 17 in the fitted state. Basically, the second drive belt 18B which moves the second belt guide 22L in the fitted state is connected to the second shoe 38 in a form of fitting into a notch that is formed in accordance with the position of the belt connecting portion 41 of the second shoe 38. On the other hand, the first remaining belt guide 21L of the guide rail 14L guides the movement of a portion extending to a side opposite to the first shoe 37 in the forward and rearward direction with respect to a connecting part of the first drive belt 18A to the electric drive source 17 in the fitted state, Moreover, the first shoe 37 and the second shoe 38 respectively have a substantially arcuate upper flexure portion 43 elastically coming into contact with a lower surface (third guide 23) of the ceiling wall 14h of the guide rails 14R and 14L. In addition, the first shoe 37 and the second shoe 38 respectively have a substantially arcuate side flexure portion 44. The side flexure portion 44 of the first shoe 37 elastically comes into contact with a surface (third guide 23) of the upper wall 14e and the slip-off preventing piece 14g of the guide rail 14R on the vehicle inside and the side flexure portion 44 of the second shoe 38 elastically comes into contact with a surface (third guide 23) of the upper wall 14d and the slip-off preventing piece 14f of the guide rail 14L on the vehicle outside.

As described above in detail, in the embodiment, it is possible to achieve the following effects.

(1) In the embodiment, each of the first shoe 37 and the second shoe 38 is mounted on each connecting portion 36a in the engagement state. Therefore, it is possible to reduce manufacturing man-hours, for example, compared to a case of outsert molding, In addition, the first shoe 37 and the second shoe 38 have the same shape as each other in a form of being connected so as to integrally move with the first drive belt 18A and the second drive belt 18B in the first guide 21 and the second guide 22 of the guide rails 14R and 14L on corresponding sides. Therefore, it is possible to share the first shoe 37 and the second shoe 38 on both sides in the width direction of the vehicle and also to share the mold for molding. Therefore, it is possible to further reduce manufacturing man-hours.

(2) In the embodiment, the second guide 22 of the guide rail 14R on a side in which the first shoe 37 is disposed and the first guide 21 of the guide rail 14L on a side in which the second shoe 38 is disposed are respectively used as the second remaining belt guide 22R and the first remaining belt guide 21L. Therefore, it is possible to omit, for example, casing pipes and fixtures for guiding corresponding portions of the first and second drive belts 18A and 18B, and spaces required for placements thereof.

Particularly, if a sufficient opening amount is set, it is required to increase a length of the casing pipe or the number of fixtures for guiding the first and second drive belts 18A and 18B in accordance with an increase of the moving amount of the first and second drive belts 18A and 18B. However, it is possible to eliminate the need for such countermeasures by using the guide rails 14R and 14L (remaining belt guides) that become longer in accordance with the opening amount.

(3) In the embodiment, the two connecting portions 36a have the same shape as each other. That is, it is possible to share the connecting portions 36a on both sides in the width direction of the vehicle and also to share the mold for molding. Therefore, it is possible to further reduce manufacturing man-hours.

(4) In the embodiment, the first and second shoes 37 and 38 are not outsert molded into each connecting portion 36a and thereby it is possible to reduce component costs. Otherwise, facilities for the outsert molding are not required and thereby it is possible to improve the degree of freedom of production sites.

(5) In the embodiment, each of the first and second shoes 37 and 38 has the upper flexure portion 43 and the side flexure portion 44 (plurality of flexure portions) elastically coming into contact with the third guide 23. Therefore, it is possible to further stabilize each posture of the first and second shoes 37 and 38 in the guide rails 14R and 14L and to further stabilize quality thereof.

Moreover, the embodiment described above may be changed as follows.

In the embodiment, the two connecting portions 36a may not have the same shape as each other as long as they are bilaterally symmetrical.

In the embodiment, the portion extending to the side opposite to the first shoe 37 with respect to the connecting part of the first drive belt 18A to the electric drive source 17 may be guided by a casing pipe and the like that are separately provided from the guide rail 14L (first remaining belt guide 21L). Similarly, the portion extending to the side opposite to the second shoe 38 with respect to the connecting part of the second drive belt 18B to the electric drive source 17 may be guided by a casing pipe and the like that are separately provided from the guide rail 14R (second remaining belt guide 22R).

In the embodiment, the first guide 21 and the second guide 22 are respectively disposed on the vehicle inside and the vehicle outside of the guide rail 14, but the disposition thereof may be reversed to each other.

In the embodiment, each of the first and second shoes 37 and 38 may be mounted on each connecting portion 36a, for example, with a fastener such as a screw.

In the embodiment, the shielding sheet 32 (the garnish 35) moving in the forward and rearward direction is described, but may be a shielding sheet moving in the width direction or the height direction of the vehicle.

This disclosure may be applied to a shoe member (driving shoe, driven shoe, and the like) for controlling a movable panel or a posture of the movable .panel of the sunroof as the moving body, a shoe member for guiding a movement (opening and closing) of a shade panel, and the like.

Next, technical ideas that can be grasped from the embodiment and the modification examples described above are appended as follows.

A moving device according to an aspect of this disclosure includes a moving body; guide rails which are a pair of guide rails extending in a moving direction of the moving body on both sides in one direction orthogonal to the moving direction and in which each of the guide rails has a first guide and a second guide which are mutually symmetrical in the one direction, and a third guide interposed between the first guide and the second guide in the one direction; a pair of connecting portions that are provided at both-side end portions of the moving body in the one direction and are mutually symmetrical in the one direction; a first shoe that is mounted on one of the two connecting portions in an engagement state and slides the first guide and the third guide of the guide rail on the corresponding side; a second shoe that is mounted on the other of the two connecting portions in an engagement state, slides the second guide and the third guide of the guide rail on the corresponding side, and has the same shape as that of the first shoe; a first drive belt that is connected to the first shoe in the first guide to be integrally moved and moves and drives the first shoe; and a second drive belt that is connected to the. second shoe in the second guide to be integrally moved and moves and drives the second shoe.

According to this configuration, the first shoe and the second shoe have the same shape as each other in a form of being connected to the first drive belt and the second drive belt in the first guide and the second guide of the guide rail on the corresponding side so as to be integrally moved. Therefore, it is possible to share the first shoe and the second shoe on both sides in the one direction, also to share the mold for molding, and to reduce manufacturing man-hours.

It is preferable that the moving device further includes an electric drive source that is connected to the first and second drive belts, and drives the first and second drive belts to be moved, the first guide and the second guide of the guide rail on a side in which the first shoe is disposed respectively configure a first belt guide that guides a part extending on a first shoe side with respect to a connecting part of the first drive belt to the electric drive source and a second remaining belt guide that guides a part extending on a side opposite to the second shoe with respect to a connecting part of the second drive belt to the electric drive source, and the second guide and the first guide of the guide rail on a side in which the second shoe is disposed respectively configure a second belt guide that guides a part extending on a second shoe side with respect to a connecting part of the second drive belt to the electric drive source and a first remaining belt guide that guides a part extending on a side opposite to the first shoe with respect to a connecting part of the first drive belt to the electric drive source.

According to this configuration, the second guide of the guide rail on the side in which the first shoe is disposed and the first guide of the guide rail on the side in which the second shoe is disposed are respectively used as the second remaining belt guide and the first remaining belt guide. Therefore, for example, it is possible to omit casing pipes and the like for guiding the corresponding parts of the first drive belt and the second drive belt.

The aspect of this disclosure has an advantage of it being possible further reduce the manufacturing man-hours.

In the moving device, it is preferable that the two connecting portions are mutually symmetrical in the one direction by reversing one of the two connecting portions having the same shape as each other in the moving direction.

According to this configuration, the two connecting portions have the same shape as each other. That is, it is possible to share the connecting portions on both sides in the one direction and also to share the mold for molding. Therefore, it is possible to further reduce manufacturing man-hours.

In the moving device, it is preferable that each of the first and second shoes has the plurality of flexure portions elastically coming into contact with the third guide.

With this configuration, it is possible to further stabilize each posture of the first shoe and the second shoe in the corresponding guide rails.

In the moving device, it is preferable that each of the first shoe and the second shoe supports the connecting portion in the support portion that is supported on the third guide.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A moving device comprising:
   a moving body;
   a first guide rail and a second guide rail extending in a moving direction of the moving body and being spaced apart from one another in one direction orthogonal to the moving direction, each of the guide rails having a first guide and a second guide which are mutually symmetrical in the one direction, and a third guide interposed between the first guide and the second guide in the one direction;
   a pair of connecting portions that are provided at opposing side end portions of the moving body in the one direction and are mutually symmetrical in the one direction;
   a first shoe that is mounted on one of the two connecting portions in an engagement state and slides with respect to the first guide and the third guide of the first guide rail;

a second shoe that is mounted on the other of the two connecting portions in an engagement state, slides with respect to the second guide and the third guide of the second guide rail, and has the same shape as that of the first shoe;

a first drive belt that is connected to the first shoe in the first guide and moves and drives the first shoe; and a second drive belt that is connected to the second shoe in the second guide and moves and drives the second shoe, wherein each of the first shoe and the second shoe has a plurality of flexure portions positioned within the third guide and elastically coming into contact with the third guide.

2. The moving device according to claim 1, further comprising:

an electric drive source that is connected to the first and second drive belts, and drives the first and second drive belts such that they move, wherein the first guide and the second guide of the guide rail on the first side respectively configure a first belt guide that guides a part extending on a first shoe side to the electric drive source and a second remaining belt guide that guides a part extending on a side opposite to the second shoe to the electric drive source, and wherein the second guide and the first guide of the guide rail on the second side respectively configure a second belt guide that guides a part extending on a second shoe side to the electric drive source and a first remaining belt guide that guides a part extending on a side opposite to the first shoe to the electric drive source.

3. A moving device comprising:

a moving body;

a first guide rail and a second guide rail extending in a moving direction of the moving body and being spaced apart from one another in one direction orthogonal to the moving direction, each of the guide rails having a first guide and a second guide which are mutually symmetrical in the one direction, and a third guide interposed between the first guide and the second guide in the one direction;

a pair of connecting portions that are provided at opposing side end portions of the moving body in the one direction and are mutually symmetrical in the one direction;

a first shoe that is mounted on one of the two connecting portions in an engagement state and slides with respect to the first guide and the third guide of the first guide rail;

a second shoe that is mounted on the other of the two connecting portions in an engagement state, slides with respect to the second guide and the third guide of the second guide rail, and has the same shape as that of the first shoe;

a first drive belt that is connected to the first shoe in the first guide and moves and drives the first shoe; and a second drive belt that is connected to the second shoe in the second guide and moves and drives the second shoe, wherein each of the first shoe and the second shoe includes a support portion supporting the connecting portion with respect to the third guide; wherein each of the first shoe and the second shoe has a plurality of flexure portions positioned within the third guide and elastically coming into contact with the third guide.

4. The moving device according to claim 3, further comprising:

an electric drive source that is connected to the first and second drive belts, and drives the first and second drive belts such that they move, wherein the first guide and the second guide of the guide rail on the first side respectively configure a first belt guide that guides a part extending on a first shoe side to the electric drive source and a second remaining belt guide that guides a part extending on a side opposite to the second shoe to the electric drive source, and wherein the second guide and the first guide of the guide rail on the second side respectively configure a second belt guide that guides a part extending on a second shoe side to the electric drive source and a first remaining belt guide that guides a part extending on a side opposite to the first shoe to the electric drive source.

* * * * *